United States Patent [19]

Berthelot et al.

[11] Patent Number: 4,549,924

[45] Date of Patent: Oct. 29, 1985

[54] DEVICE FOR INSTANTANEOUSLY CHANGING THE GLUING WIDTH OF A WEB OF PAPER IN THE MANUFACTURE OF CORRUGATED CARDBOARD, AND PROCESS FOR USE OF SUCH A DEVICE

[75] Inventors: Daniel Berthelot, Montluel; Jean-Paul Girerd, les Avenieres, both of France

[73] Assignee: S. A. Martin, Villeurbanne, France

[21] Appl. No.: 568,463

[22] Filed: Jan. 5, 1984

[30] Foreign Application Priority Data

Jan. 28, 1983 [FR] France ................................ 83 01307

[51] Int. Cl.$^4$ ................................................ B32B 1/00

[52] U.S. Cl. .................................... 156/470; 118/204; 118/262; 156/578

[58] Field of Search ............... 118/204, 261, 262, 102; 156/470–473, 578

[56] References Cited

U.S. PATENT DOCUMENTS 2,525,920 10/1950 Mackey .............................. 118/204

*Primary Examiner*—David Simmons

[57] ABSTRACT

Device permitting the instantaneous changing of the width of application of glue to a web of paper in the manufacture of corrugated cardboard, the glue being applied to the web with the aid of a gluing cylinder (5) driven rotationally and dipping into a tank of glue over a width adjusted by two barriers which are movable in the tank. It includes a detachable auxiliary doctor device (1) comprising two doctors (2) to be applied momentarily to the two longitudinal ends of the gluing cylinder (5), on the non-immersed top part of the latter, the said doctor device being in addition equipped with a device for adjusting the distance (L3) left free for the passage of the glue between the two doctors.

3 Claims, 4 Drawing Figures

DEVICE FOR INSTANTANEOUSLY CHANGING THE GLUING WIDTH OF A WEB OF PAPER IN THE MANUFACTURE OF CORRUGATED CARDBOARD, AND PROCESS FOR USE OF SUCH A DEVICE

FIELD OF THE INVENTION

The present invention relates to a device making it possible to effect an instantaneous change of the width glued in the manufacture of corrugated cardboard, particularly single-face corrugated cardboard, and more particularly on the passage of an automatic join between two reels of corrugating paper of different widths. The invention also relates to a process for the utilization of this device.

BACKGROUND OF THE INVENTION

In a corrugating machine intended for the manufacture of single-face corrugated cardboard, for example of the type described in French Pat. No. 2,433,985, the web of corrugating paper is corrugated by passing between two grooved cylinders and glued to a web of cover paper between the lower grooved cylinder located downstream and a smooth cylinder around which the cover paper passes.

The glue is deposited on the summits of the corrugations of the corrugating paper with the aid of a gluing cylinder driven in a rotary movement and dipping into a tank of glue. The width of the gluing zone, i.e., the zone of the cylinder wetted by the glue, is conventionally dictated, as described in detail in the above-mentioned French patent, by the adjustable distance between two barriers, both of which are movable in the glue tank.

If the gluing zone is narrower than the width of the web of corrugating paper, wastage occurs through lack of glue on the edges.

If the gluing zone is wider than the width of the web of corrugating paper, the excess glue is then deposited on the lower grooved cylinder, thus soiling it and entailing stoppages of the machine for cleaning purposes. These two problems have become crucial because of the generalized use of reel launchers which now make it possible for the end of one reel to be connected practically end to end to the beginning of the next reel. When the two reels are of the same width, the gluing zone remains the same and there is no difficulty. However, the hazards of manufacturing programs often have the consequence that the widths of successive reels are not the same, and it is then necessary to change the position of the barriers, in order to ensure that the gluing zone corresponds to the new width of paper being processed. This movement takes a certain time, and, as the change of width of the paper is instantaneous, either wastage is then caused through lack of glue or the lower grooved cylinder is soiled.

At the present time this problem is solved by completely shutting down the machine during the movement of the barriers in the glue tank. This obviously entails a not inconsiderable loss of production.

SUMMARY OF THE INVENTION

The device according to the invention makes it possible to change instantaneously, i.e., without stopping the machine, the width of the gluing zone of the gluing cylinder at the moment when the join between the two reels passes. It comprises in addition a detachable auxiliary doctor device comprising two doctors intended to be applied momentarily to the two ends of the gluing cylinder, on the upstream nonimmersed part of the latter, this doctor device being in addition equipped with means for adjusting the distance left free for the passage of the glue between the two doctors, and with means for moving the doctors between an operative position bearing against the gluing cylinder and a disengaged position out of contact with the cylinder.

The doctor device is advantageously composed of a cylinder provided with two end sleeves of increased thickness, which are symmetrical in relation to the transverse plane of symmetry of the cylinder and whose two inner faces opposite one another are cut out in helix form in such a manner as to define a free width for the passage of the glue varying continuously in accordance with the fixed, but adjustable, angular position given to the cylinder.

BRIEF DESCRIPTION OF THE DRAWINGS

The invention will be better understood with the aid of the following description of a preferred example of embodiment, with reference to the accompanying drawings, in which.

DETAILED DESCRIPTION

Figure 1:
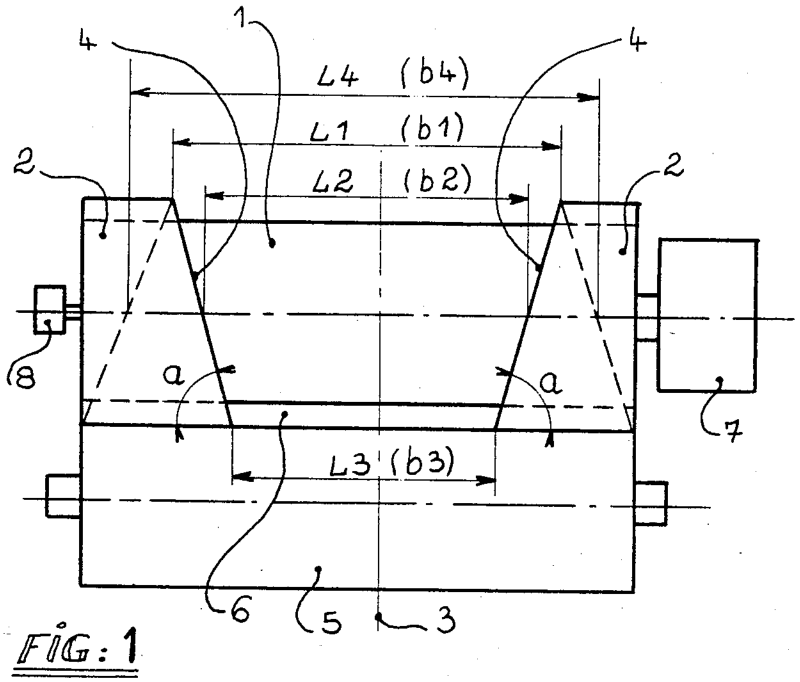
FIG. 1 shows schematically the auxiliary doctor device with which the device according to the invention is equipped.
Figure 2:
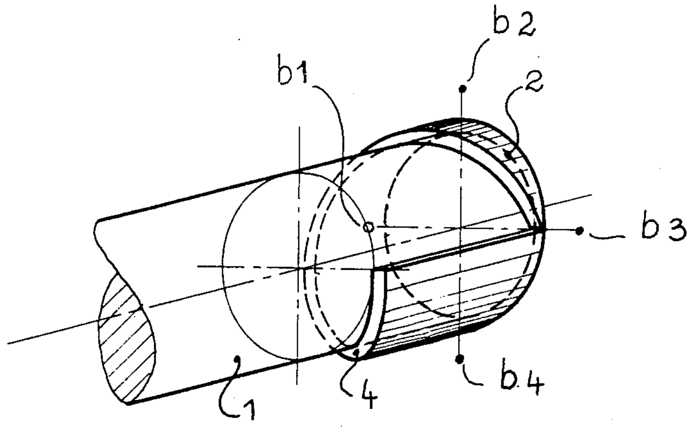
FIG. 2 is a view in perspective of one of the doctor sleeves with which the auxiliary device shown in FIG. 1 is equipped.

Referring first to FIGS. 1 and 2 taken together, the auxiliary doctor device is composed of a metal roller 1 covered at both ends by a non-metallic material, such as polyurethane, forming two sleeves 2 having a greater thickness than the roller.

As can be seen in the drawings, the two sleeves 2 are symmetrical in relation to the transverse median plane 3 of the cylinder 1 and their inside faces 4 opposite one another form an angle a to the horizontal and are cut out in helix form, as shown in perspective in FIG. 2.

If, as illustrated in FIG. 1, the cylinder 1 equipped with its sleeves 2 is applied against a gluing cylinder 5, it can be seen that the two sleeves 2 come into contact with the roller 5, so that the roller 1 does not touch the roller 5, thus freeing for the glue a passage 6 between these rollers, the width L of this passage corresponding to the distance existing between the two sleeves 2 along the generatrix of contact between the two cylinders 1 and 5.

Moreover, the width of the space 6 is made adjustable by the very shape of the sleeves, in dependence on the angular position b which is fixed for the roller 1 in relation to its axis:

an angular position b1 gives a distance L1,
an angular position b2 gives a distance L2,
an angular position b3 gives a distance L3,
an angular position b4 gives a distance L4.

In order to cbtain a distance L between the two sleeves 2 on a given generatrix corresponding to the generatrix of contact between the rollers 1 and 5, the roller 1 is brought into the corresponding angular position b with the aid of a low-speed irreversible motor 7, for example.

An angular measurement device, such as a potentiometer 8 connected to an electric measuring device, makes it possible to ensure that the roller 1 is actually in the desired angular position b. Since the motor 7 is irreversible, the cylinder 1 is then locked in respect of rotation despite its contact with the gluing cylinder 5, which rotates continuously. The sleeves 2 form a doctor for the glue outside the space 6, and this glue falls back into the glue tank in which the cylinder 5 is immersed.

Figure 3:
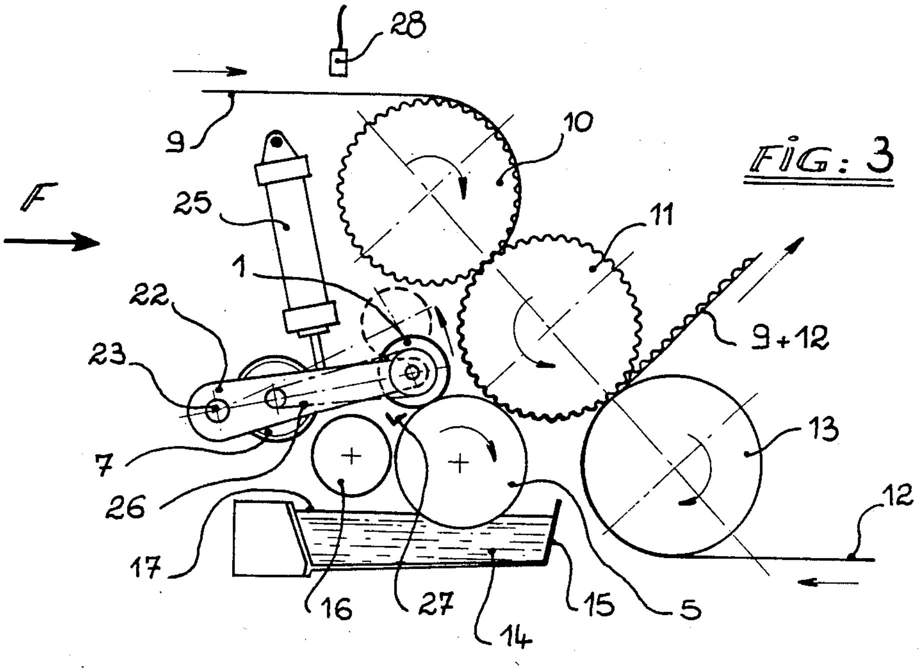
FIG. 3 is a schematic side view of a single-face corrugating machine equipped with the device according to the invention, in the lowered doctoring position.
Figure 4:
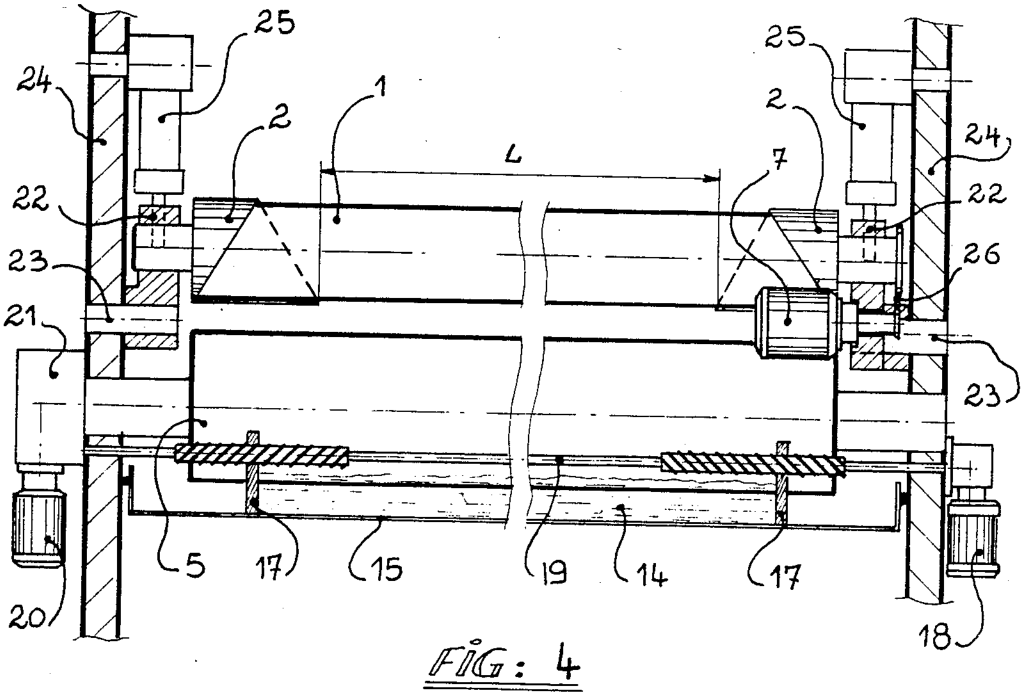
FIG. 4 is an end view, in the direction F in FIG. 3, of the part of the single-face corrugating machine equipped with the device according to the invention, this device being in the raised position.

FIGS. 3 and 4 show schematically a single-face gluing machine which for the purpose of permitting the instantaneous changing of the width glued makes use of the doctor device shown in FIGS. 1 and 2.

In FIG. 3 can be seen a single-face corrugating machine in which, in a very conventional manner, the corrugating paper 9 is corrugated by passing between an upper grooved cylinder 10 and a lower grooved cylinder 11, and is then glued to a cover paper 12 between the lower grooved cylinder 11 and a smooth cylinder 13.

Once corrugated, the corrugating paper receives glue on the summits of its corrugations with the aid of a gluing cylinder 5 whose lower part dips into the glue 14 contained in the tank 15. The thickness of glue deposited on the corrugating paper is adjusted by the space existing between the gluing cylinder 5 and a cylinder 16 which is not immersed and which is known as the doctor cylinder.

Likewise in conventional manner, the width of the gluing zone of the gluing cylinder 5 is dictated by the distance existing between two barriers 17, which distance can be adjusted, as can be seen in FIG. 4, by a conventional translation device comprising a motor 18 and a reverse-pitch worm 19. In FIG. 4 it is also possible to see the conventional rotary drive device for the gluing cylinder 5 comprising a motor 20 and bevel gear set 21.

According to the invention, a doctor device of the type previously described with reference to FIGS. 1 and 2 can now be momentarily applied against the top part, on the upstream side, of the gluing cylinder 5.

As can be seen in FIGS. 3 and 4, the roller 1, carrying its two previously described sleeves 2, is supported by two levers 22, each lever being articulated on a pivot 23 fixed in each frame 24 and controlled by a jack 25, which is also articulated on the corresponding frame 24. The jacks 25 make it possible to obtain an upper position, in which the roller 1 is not applied against the gluing cylinder 5, thus permitting the free passage of the glue deposited on the cylinder after dipping into the tank 15.

In the lower position the roller 1 comes to bear against the cylinder 5 by means of its sleeves 2, thus limiting the gluing zone to the distance L which separates the two doctor sleeves 2 on the generatrix of contact of the roller 1 and the gluing cylinder 5.

The roller 1 can be driven rotationally by means of the irreversible motor 7 and the pinion and chain transmission 26. It is thus possible to adjust the distance L desired between the two sleeves 2 before the roller 1 is applied against the cylinder 5. As the motor 7 is irreversible, the roller 1, once it has been brought to its angular adjustment position b, is locked in that angular position despite its contact with the cylinder 5, which turns continuously. The distance L is therefore maintained throughout all the time of contact between the roller 1 and the cylinder 5. The surplus glue due to the wiping of the cylinder 5 by the sleeves 2 is collected in a transverse channel 27.

The operation of the device which has just been described is as follows:

EXAMPLE 1

Changing over from a large paper width to a smaller width.

During the period of working with the large width, the roller 1 was raised and the width of the gluing zone of the roller 5 was adapted to the width of the web of corrugating paper solely by the barriers 17 of the glue tank. In order to prepare for the change of width, with the roller 1 still in the raised position, the distance L between the two sleeves 2 is set to the new smaller value with the aid of the motor 7. A detector system, for example of the photoelectric cell type, detects the joining of the two widths. An electronic calculator (not shown) calculates the time which will elapse for the join to arrive at the paper gluing point, in dependence on the distance to be traveled and on the speed of movement of the web. At the end of this time the jacks 25 are operated to bring the roller 1 into contact with the cylinder 5, thus instantaneously limiting the gluing zone to the new distance L corresponding to the new width being processed. From this moment onwards the barriers 17 are brought into movement to take up positions coinciding with the new width being processed. The roller 1 can then be raised again. The surplus glue due to the wiping of the cylinder 5 by the sleeves 2 during the movement of the barriers is recovered in the channel 27.

It can be seen that during the entire period of operation of the barriers 17 between the wide position and the new narrower position, the doctor sleeves will have temporarily attended to the limitation of the gluing zone, and they will have done so instantaneously.

EXAMPLE 2

A change is made from a small paper width to a greater width.

In this case, in order to prepare for the change of width, the roller 1 and the doctors 2 are once again applied against the gluing roller 5, which has no immediate effect because the gluing width determined by the barriers 17 is the same as that determined by the angular position of the helicoidal doctors 2. With the aid of the motor 18 it is then possible to displace the barriers 17 progressively to their new position corresponding to the new large width. During the entire period of operation of the barriers 17, the surplus glue entrained by the roller 5 will be removed by the doctors 2 and recovered in the channel 27. At the moment determined by the electronic calculator, when the join of the two webs of paper arrives in front of the roller 5, the jacks 25 are operated to raise the roller 1; the doctors 2 then cease to operate and the gluing zone is instantaneously brought to its new greater width determined by the barrier 17. It would be possible to use other equivalent means for adjusting the variable distance between the doctors 2, which would then not necessarily be helicoidal sleeves, and also for selectively displacing them between an operative position bearing against the ends of the gluing cylinder 5 and a disengaged position out of contact with this cylinder 5.

We claim:

1. Device for an instantaneously changing gluing width on a web of paper in the manufacture of corrugated cardboard, glue being applied to said web (9) by means of a gluing cylinder (5) having two ends, driven rotationally and partly dipping into glue (14) over a width determined by an adjustable device (17), said device comprising a detachable auxiliary doctor device comprising two doctors (2) applied momentarily to said two ends of said gluing cylinder, on the upstream non-immersed part of the latter, said doctor device being equipped with means (7) for adjusting the distance (L) left free for the passage of glue between said two doctors (2), and with means (25) for moving said doctors (2) between an operative position bearing against said cylinder (5) and a disengaged position out of contact with said cylinder (5).

2. Process for the utilization of a device for instantaneously changing gluing width on a web of paper in the manufacture of cardboard, glue being applied to said web (9) by means of a gluing cylinder (5) having two ends, driven rotationally and partly dipping into glue (14) over a width determined by an adjustable device (17), said device comprising a detachable auxiliary doctor device comprising two doctors (2) applied momentarily to said two ends of said gluing cylinder, on the upstream non-immersed part of the latter, said doctor device being equipped with means n(7) for adjusting the distance (L) left free for the passage of glue between said two doctors (2), and with means (25) for moving said doctors (2) between an operative position bearing against said cylinder (5) and a disengaged position out of contact with said cylinder (5) applied to the case where a change is made from a large paper width to a smaller width, comprising the steps of (a) moving said doctor device (1) out of contact with said gluing cylinder (5);

(b) adjusting the distance (L) between said two doctors (2) so that it is equal to said new smaller width;

(c) applying said doctor device against said gluing cylinder at the moment when the join of said large and smaller widths is to arrive at the point where said paper is glued;

(d) moving said device (17) for adjusting the width of immersion of the gluing cylinder in said glue in such manner that it is adjusted to said new smaller width; and (e) again moving said doctor device so that it is out of contact with said gluing cylinder.

3. A process for the utilization of a device for instantaneously changing gluing width on a web of paper in the manufacture of cardboard, glue being applied to said web (9) by means of a gluing cylinder (5) having two ends, driven rotationally and partly dipping into glue (14) over a width determined by an adjustable device (17), said device comprising a detachable auxiliary doctor device comprising two doctors (2) applied momentarily to said two ends of said gluing cylinder, on the upstream non-immersed part of the latter, said doctor device being equipped with means (7) for adjusting the distance (L) left free for the passage of glue between said two doctors (2), and with means (25) for moving said doctors (2) between an operative position bearing against said cylinder (5) and a disengaged position out of contact with said cylinder (4), applied to the case where a change is made from a small paper width to a larger width, comprising the following steps;

(a) moving said doctor device (1) out of contact with said gluing cylinder (5);

(b) adjusting the distance (L) between said two doctors (2) so that it is equal to said small width;

(c) before the join, applying said doctor device thus adjusted against said gluing cylinder;

(d) still before the join, moving said device (17) for adjusting the width of immersion of said gluing cylinder in said glue in such a manner that it is adjusted to the new greater width;

(e) determining the moment when the join of the two respective widths is to arrive at the point where the papers is glued, and at that moment moving said doctor device (1) out of contact with said gluing cylinder.

* * * * *